UNITED STATES PATENT OFFICE.

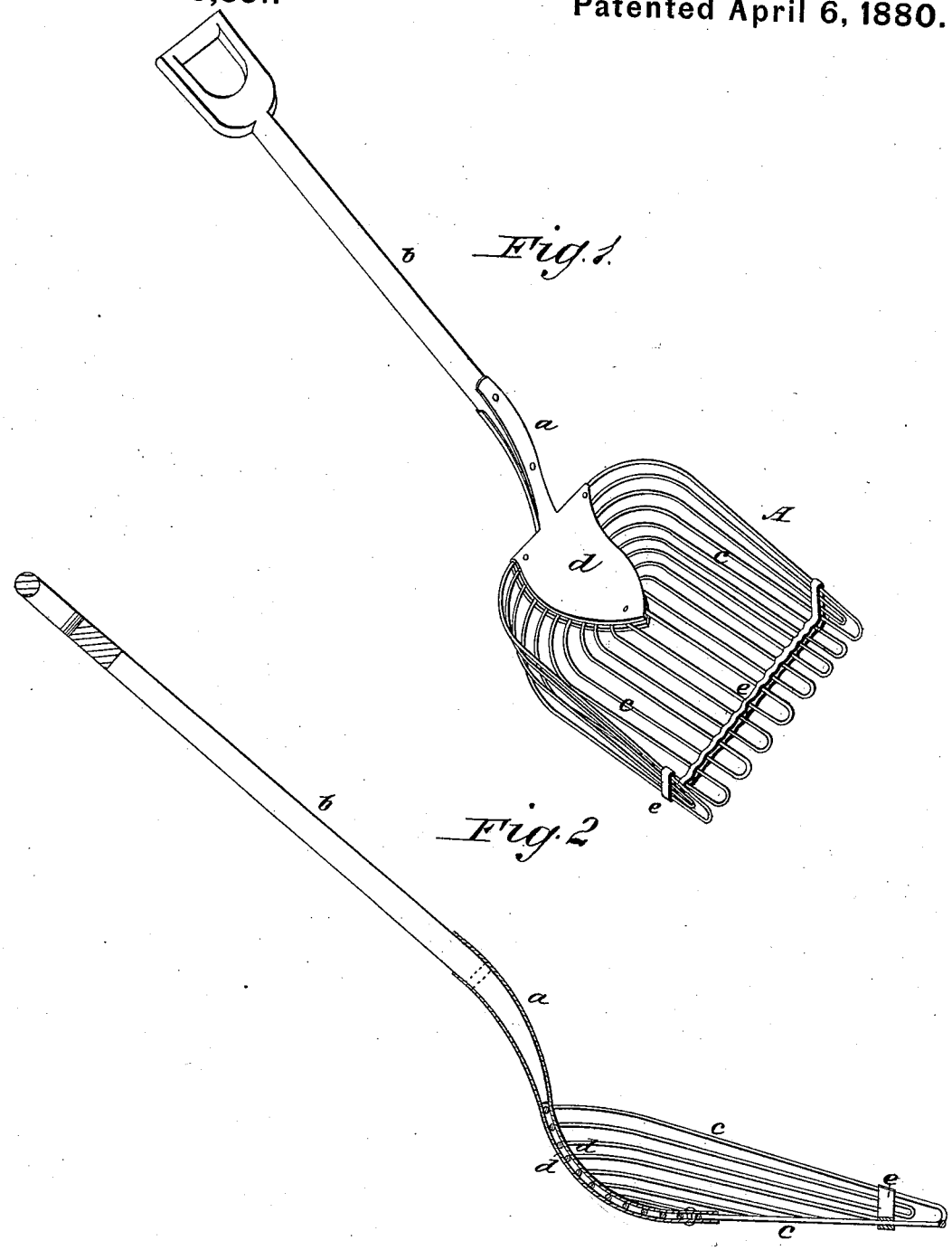

WILLIAM A. REDDICK, OF NILES, MICHIGAN.

SHOVEL OR SCOOP.

SPECIFICATION forming part of Letters Patent No. 226,351, dated April 6, 1880.

Application filed December 10, 1879.

*To all whom it may concern:*

Be it known that I, WILLIAM A. REDDICK, of Niles, in the county of Berrien and State of Michigan, have invented a new and Improved Shovel or Scoop, of which the following is a specification.

My improvement relates more particularly to shovels or scoops for handling potatoes, corn, coal, or other materials which are mixed with more or less dust or dirt; and the object of the invention is to provide a scoop which will act as a screen to separate the refuse.

My invention is an improvement in that class of shovels in which a series of parallel wires constitute the body of the shovel and form a screen.

The improvement consists, mainly, in making the parallel wires with their ends bent to form loops, and combining with these wires a transverse tie or brace located short of the ends of the wires, or a little distance from the loops, so that the latter may form the edge of the shovel, as hereinafter more fully described.

The invention is illustrated by the accompanying drawings, forming part of this specification, wherein—

Figure 1 is a perspective view of a scoop constructed in accordance with my invention. Fig. 2 is a sectional side elevation of the same.

Similar letters of reference indicate corresponding parts.

A is the blade, attached by its socket $a$ to a handle, $b$, of any usual character. The blade A is formed of wires $c$, of iron or steel, placed parallel to each other in a direction lengthwise of the blade, and secured at their inner ends between the plates $d$ $d$, that are formed with or attached to socket $a$, these plates being secured together by rivets, whereby the wires are securely held. The wires $c$ at the sides are bent to the shape required to form the sides of the scoop, as shown. The wires are preferably made double, and the return bend or doubled end placed to form the edge of the blade, and the wires at the outer end are strengthened and held in place by the wire or narrow metal strip $e$, that is attached or interwoven in any desired manner across near the outer end of the blade.

The spaces between the wires may be of any desired width, and instead of the wire-work forming the greater portion of the blade, as shown, the plates $d$ may extend far enough down to form the head portion and sides of the shovel. There may also be cross-wires interwoven throughout the blade; but I prefer the construction shown, as the wires thus offer the least obstruction in shoveling up any material.

This construction furnishes a strong and light scoop or shovel especially adapted for use in shoveling potatoes, corn, coal, or other materials that are mixed with dirt. In such cases the dirt will readily separate from the material and fall through the interstices of the blade. The doubled ends of the wires form an edge that will take up such materials as potatoes without sticking into them.

Instead of being arranged at the edge, as shown, the wires may be placed in pairs, one inside the other, as shown at the sides, and in some cases the bends may be made at right angles and lie against each other to form a continuous wire edge.

In defining my invention more clearly I would state that I do not claim, broadly, making the tines of parallel sections of wire with a bend or loop at the end to form the edge of the implement, as this feature is shown in the expired patent to Z. Breed, for a rake, No. 7,434, granted June 18, 1850, and also in other subsequent patents. When, however, long parallel and bent tines of this character are used to form a shovel some sort of stay or brace near the outer edge becomes necessary to prevent the flexible wire tines from bending out of shape. If this stay or transverse brace be placed directly at the edge, as has heretofore been done, it forms a cutting-edge which scars and cuts the potatoes or other vegetables; but when placed a little distance from the edge of the bent or looped tines it stays or braces the tines against torsional or lateral displacement, and still preserves the rounded edge of the loops. This combination, then, of the wires with looped or bent ends and the cross tie or brace located above the bend of the wires I consider to be new, and claim it as my invention.

Having thus described my invention, I claim as new and desire to secure by Letters Patent—

1. The combination, in a shovel, of a set of parallel wires or tines with bent ends and a cross tie or brace located above the looped or bent ends, as shown and described.

2. A scoop or shovel having its blade formed of wires $c$, that are bent double at the outer ends, clamped between the plates $d$, and stayed by the cross-strips $e$, substantially as and for the purposes set forth.

WILLIAM ARTHUR REDDICK.

Witnesses:
HENRY M. DEAN,
WILLIAM W. COLBY.